United States Patent [19]
Gordon et al.

[11] 4,110,985
[45] Sep. 5, 1978

[54] DUAL POWER BRAKE BOOSTER

[75] Inventors: Ralph A. Gordon, Centerville; Thomas P. Mathues, Miamisburg; Donald L. Parker, Middletown, all of Ohio

[73] Assignee: General Motors Corporation, Detroit, Mich.

[21] Appl. No.: 675,497

[22] Filed: Apr. 9, 1976

[51] Int. Cl.$^2$ .............................. B60T 13/12
[52] U.S. Cl. ...................... 60/548; 60/550; 60/568; 60/593
[58] Field of Search ............... 60/547, 548, 550, 562, 60/585, 593, 576, 578, 568; 91/369, 391 R, 411

[56] References Cited

U.S. PATENT DOCUMENTS

| | | | |
|---|---|---|---|
| 3,540,219 | 11/1970 | Huruta | 60/553 |
| 3,618,321 | 11/1971 | Moran | 60/548 |
| 3,685,289 | 8/1972 | Kobashi | 60/552 |
| 3,813,992 | 6/1974 | Brown | 91/189 |
| 3,877,228 | 4/1975 | Shellhouse | 60/562 |
| 3,935,709 | 2/1976 | Mathues | 60/547 |
| 4,007,664 | 2/1977 | Popp | 91/369 B |

FOREIGN PATENT DOCUMENTS

| | | | |
|---|---|---|---|
| 1,016,036 | 1/1966 | United Kingdom | 60/547 |

*Primary Examiner*—Martin P. Schwadron
*Assistant Examiner*—Abraham Hershkovitz
*Attorney, Agent, or Firm*—D. D. McGraw

[57] ABSTRACT

A vehicle brake booster and master cylinder assembly has a vacuum suspended booster section and a hydraulic booster section in series, and a master cylinder unit in series with the booster sections. During normal operation the vehicle operator obtains boosted brake actuating pressures from the master cylinder by operation of the hydraulic booster section throughout the normal stroke of both booster sections without operating the vacuum booster section. If additional brake actuating pressure is required after the hydraulic booster has reached its run-out condition, the master cylinder is actuated normally through mechanical force transmitting elements which are parts of the booster sections. If there is no hydraulic pressure available for hydraulic booster operation, the control valves of the booster sections move from the first range of operation which normally controls the hydraulic booster section to a second range of operation which actuates the vacuum booster section. If additional master cylinder output pressure is required when the vacuum booster section has reached its run-out condition, the master cylinder is actuated manually as before. A hydraulic pressure actuated blocking mechanism prevents control valve movement to actuate the vacuum booster section when the hydraulic booster section is normally operating.

3 Claims, 3 Drawing Figures

DUAL POWER BRAKE BOOSTER

The invention relates to a dual source power brake booster assembly, and more particularly to an assembly having in series a differential air pressure operated booster section and a hydraulic pressure operated booster section connected to the master cylinder assembly. The differential air pressure operated booster section is herein disclosed as a vacuum suspended booster, but other forms of differential air pressure may be used. It is a feature of the invention to provide full booster operation by the hydraulic pressure operated booster section under normal operating conditions when hydraulic pressure power is available. Only when there is no hydraulic pressure available for this purpose is the differential air pressure operated booster section activated. When so activated, it operates through the full range of booster operation. The assembly may be operated manually if necessary to achieve either additional master cylinder output pressure after full booster operation or to operate the master cylinder initially when no power is available to either booster section.

This is a modification of the dual power brake disclosed and claimed in U.S. patent application Ser. No. 805,114, filed June 9, 1977 which is a continuation of application Ser. No. 587,148, entitled "Dual Power Brake Booster and Method of Generating Brake Actuating Pressure," filed June 16, 1975, now abandoned and assigned to the common assignee. That application covers the broad concept of dual power brake boosters of this type in which two separate power sources are used. In order to insure actuation of the hydraulic booster section in accordance with this invention, the control valve arrangement is such that the control valve elements move concurrently in two sequential ranges of operation. In the first range, the control valve for the differential air pressure booster section is not moved sufficiently far to have any effect on operation of that booster section. The movement causes the control valve assembly of the hydraulic booster section to place that booster section in condition for power operation. If hydraulic boost power is available, the power pressure generated in the booster to move the booster piston is utilized to act on the valve seat portion of the hydraulic control valve assembly to prevent the control valves of the hydraulic and differential air pressure booster sections from moving into a second range of control valve movement, thereby preventing actuation of the differential air pressure booster section so long as hydraulic power is available and being used. If there is no hydraulic pressure available for hydraulic booster operation, the control valves of the booster sections will move through the first range of valve movement and into the second range, actuating the differential air pressure booster section. This can occur since there is no blocking pressure preventing such additional movement. A mechanical transfer of manual force occurs in either condition of operation when the operating booster section reaches its run-out condition and additional force is applied by the vehicle operator to the brake pedal. If there is no booster pressure available to operate either booster section, the control valves will move through both ranges of valve movement, causing the mechanical connection through the booster sections to be set up for direct manual operation of the master cylinder assembly.

Figure 1:
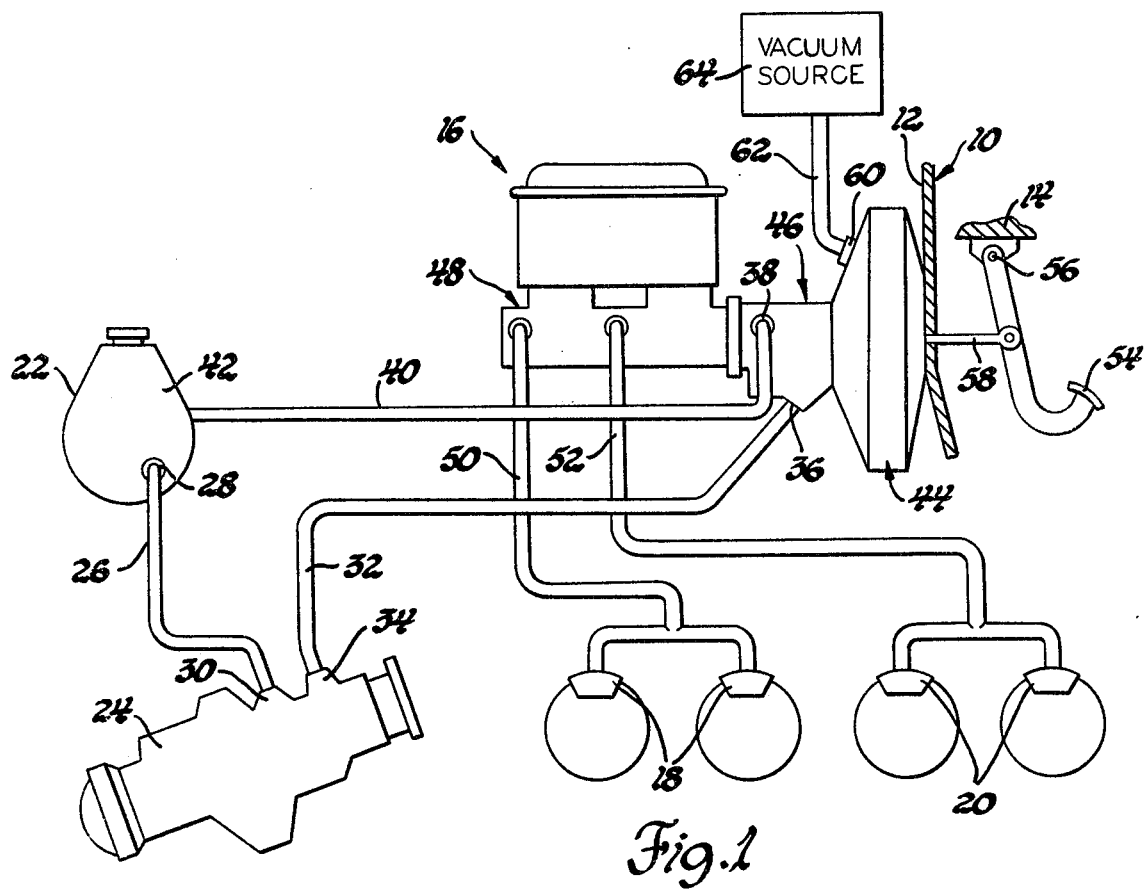
FIG. 1 is a schematic representation of a vehicle brake system embodying the invention.

The vehicle 10, schematically represented by vehicle portions such as the firewall 12 and a support member 14, is provided with a brake booster and master cylinder assembly 16 embodying the invention. Certain other portions of the vehicle are also schematically illustrated and include the vehicle front wheel brakes 18, rear wheel brakes 20, a pump 22, power steering gear 24, and suitable conduits. These conduits include conduit 26, which interconnects pump 22 and the power steering gear 24 to conduct hydraulic fluid from the pump output port 28 to the power steering gear input port 30. Conduit 32 connects the power steering gear output port 34 with the hydraulic fluid input port 36 of assembly 16. The hydraulic fluid output port 38 of assembly 16 is connected by conduit 40 to the fluid reservoir section 42 of pump 22.

The assembly 16 includes a differential air pressure operated booster section 44, a hydraulic fluid pressure operated section 46, and a master cylinder section 48. The master cylinder section has brake actuating pressure conduits 50 and 52 respectively connecting the pressurizing chambers of the master cylinder with the front wheel brakes 18 and the rear wheel brakes 20. A brake pedal assembly 54 is pivotally mounted on the vehicle support member 14 at pivot 56 and is also connected to push rod 58 to move the push rod generally axially to control the assembly 16 and transmit manual force thereto. The booster section 44 is illustrated as being of the vacuum suspended type and is connected by check valve 60 and conduit 62 to a suitable source of vacuum such as the vehicle engine intake manifold 64.

Figure 3:
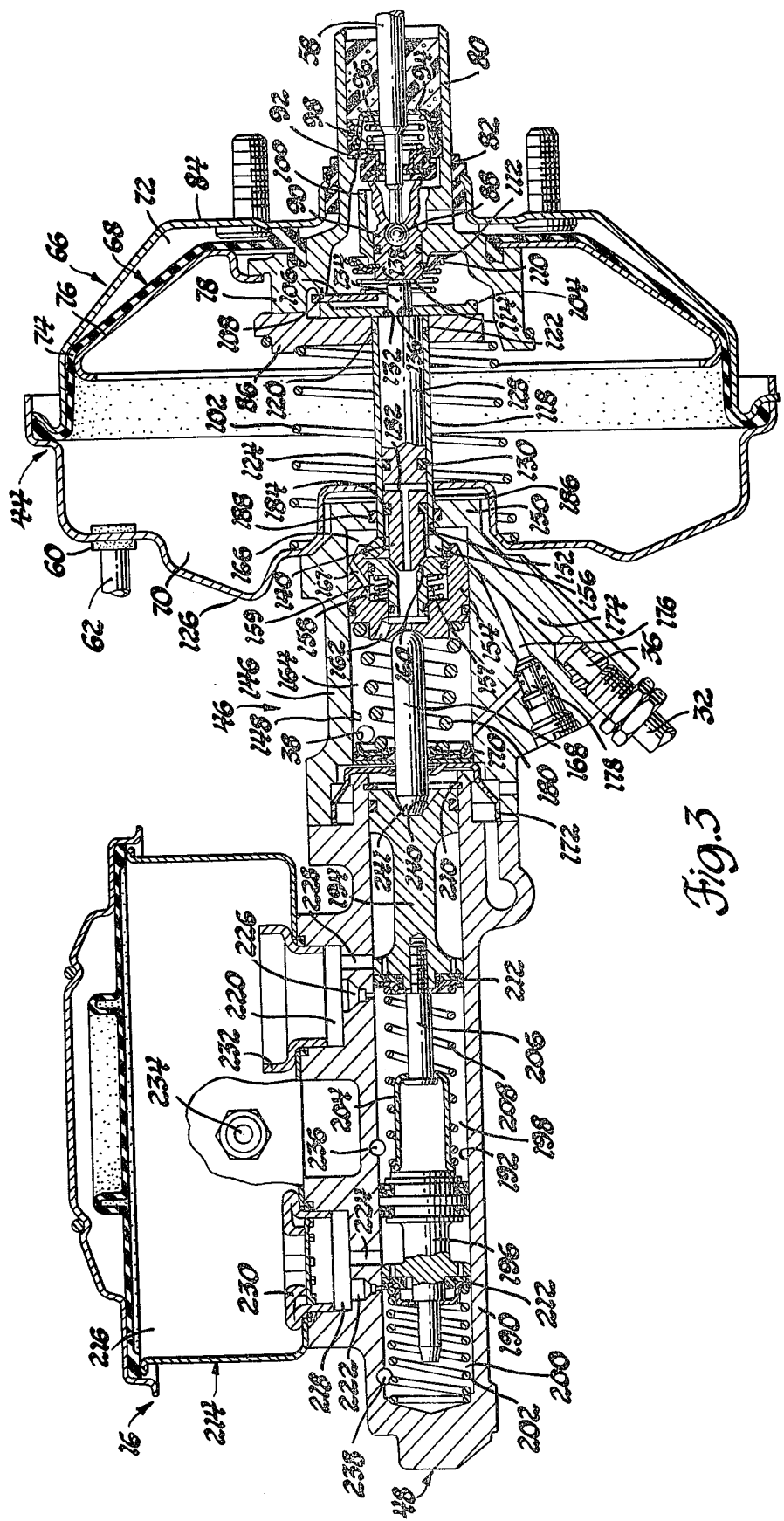
FIG. 3 is a cross-section view of the brake booster and master cylinder assembly of FIG. 1 embodying the invention.

FIG. 3 shows the assembly 16 in cross-section and in greater detail. The booster section 44 is a vacuum suspended brake booster of the general type disclosed in U.S. Pat. No. 3,249,021, entitled "Power Brake Booster." It is essentially a single diaphragm, vacuum suspended booster having a lever reaction system. It has a housing 66 which has a movable power wall 68 received therein and dividing the housing into a substantially constant pressure chamber 70 and a variable pressure chamber 72. Vacuum is maintained in chamber 70 by check valve 60 and the usual operation of the vehicle engine to which the booster is connected by conduit 62. The power wall 68 includes a diaphragm 74, a diaphragm support 76, and a piston 78 to which the diaphragm and its support are secured. Piston 78 has a rearward extension 80 which is slidable through a seal and bearing 82 provided in the rear section 84 of housing 66. A reaction retainer 86 is removably secured to piston 78. The push rod 58 has a ball end 88 received in a pocket of the air valve 90. Valve 90 is the input member of the valve mechanism which controls this booster section. Ball 88 is staked in place to provide a pivotal connection between rod 58 and air valve 90 but otherwise effectively joining them together as an input member. The air valve 90 is adapted for sliding movement through a portion of piston 78 and is arranged to meter the flow of atmospheric air to chamber 72. A floating valve 92 engages the inside wall of extension 80 of piston 78 and is held in its operative position by a retainer 94. Another portion of the floating valve 92 is maintained in engagement with the air valve 90 when the booster section is in the released position by a spring 96 and cup 98. A vacuum valve 100 is formed as a part of power piston 78 and when the booster section is in the released position floating valve 92 is slightly spaced from this valve so that vacuum is communicated from chamber 70 to chamber 72 through appropriate passages.

As is well-known in the operation of this type of booster control mechanism, leftward movement of push rod 58 and air valve 90 relative to valve 100, as viewed in FIG. 3, permits floating valve 92 to engage vacuum valve 100 to close the vacuum connection between chambers 70 and 72. Further movement of the air valve 90 relative to valve 100 causes the air valve to open relative to floating valve 92 and meter air at atmospheric pressure into chamber 72. This creates a pressure differential across power wall 68, moving the power wall leftwardly against the force of the power wall return spring 102. This also moves vacuum valve 100 and floating valve 92 leftwardly until the floating valve reengages air valve 90. The booster is then in the poised position, holding this position since both the air valve and the vacuum valve are closed. Release of the brake pedal by the operator allows push rod 58 and air valve 90 to move rightwardly, lifting floating valve 92 off of vacuum valve 100, thereby reestablishing the vacuum connection between chambers 70 and 72 and decreasing the differential pressure across power wall 68 so that power wall return spring 102 moves the power wall back to the release position shown in the drawing.

The lever reaction mechanism of booster section 44 includes a lever reaction plate 104, reaction levers 106 disposed against one edge of the lever reaction plate, and a shoulder 108 on piston 78. The reaction mechanism further includes an air valve spring 110, one end of which engages the inner ends of lever 106 and the other end of which is seated on spring retainer 112, which is fastened to air valve 90. The forward face 114 of air valve 90 engages the inner ends of levers 106 when the booster is actuated. This arrangement provides a sense of feel to the vehicle operator during operation of the power booster, as is well-known in the brake booster art.

The point at which booster section 44 differs from U.S. Pat. No. 3,249,021 in any material extent is in the arrangement of the booster section output mechanism. This mechanism includes a first output formed as a sleeve 118. The rear end 120 of sleeve 118 is slidably received in an aperture 122 of reaction retainer 86, the aperture and sleeve being axially aligned with air valve 90. Sleeve end 120 abuts lever reaction plate 104, and the sleeve forward end 124 extends through the forward section 126 of the booster housing 66 in sliding and sealed relation. A plunger 128 provides the second output of booster section 44 and is slidably received in sleeve 118 and is sealed in sliding relation with the inner wall of that sleeve by seal 130. The rear end of plunger 128 has a shoulder 132 abutting lever reaction plate 104. A reduced diameter extension 134 of plunger 128 extends rearwardly from shoulder 132 through an aperture 136 centrally formed in lever reaction plate 104. The rear face 138 of extension 134 is in mechanical engagement with face 114 of the air valve 90 so that any leftward movement of the air valve causes leftward movement of plunger 128. The forward end 140 of plunger 128 extends through and beyond the forward end 124 of sleeve 118 and is formed to provide a valve element of the valve controlling the hydraulic booster section 46 as will be described below.

The booster section 44 is normally actuated only when the hydraulic booster section has not been actuated after being conditioned for actuation. When the brake booster section 44 is operated by sufficient movement of the input member formed by push rod 58 and air valve 90, force is transmitted from the power wall 68 through the reaction levers 106 and reaction plate 104 to sleeve 118. The inner ends of the reaction levers engage the air valve face 114 to transmit a small amount of reaction force back to the brake pedal so that the operator can sense the amount of brake booster force being generated. The major portion of the reaction force is transmitted to power piston 78 through reaction levers 106 and shoulder 108. The sleeve 118 will move due to its arrangement in abutting plate 104, this movement being leftward in the brake applying direction. If the booster section 44 is actuated to a power run-out condition, further movement of air valve 90 leftwardly by the manual force exerted on the brake pedal will cause the air valve to move the plunger 128 leftwardly relative to sleeve 118 to transmit manual braking force through the booster section. Thus in normal vacuum brake booster section actuation outputs 118 and 128 move relatively, then in a unitary manner. A second stage of relative movement of these outputs, in which plunger 128 moves leftwardly relative to sleeve 118, will occur at any time that the operator exerts sufficient manual force demanding additional output force which the booster section 44 is unable to generate. Thus if vacuum connection 62 is broken, or there is no additional vacuum available from the vacuum source, and the booster chamber 72 is at atmospheric pressure, leftward movement of air valve 90 cannot cause further power actuation of the booster section. Air valve 90 will therefore actuate plunger 128 by transmitting the manual force mechanically thereto as above described. For the purpose of this disclosure and the appended claims, any condition of either booster section in which the booster output force is not sufficient to meet the demand force is referred to as booster power run-out. The term therefore includes a total lack of power for operation of a booster section, a partial availability of such power, or conditions wherein the fully available power is present and has been used.

The hydraulic booster section 46 includes a housing 146 having a bore 148 therein, the rear end of the bore having a rear wall 150 through which an opening 152 is provided. A power piston 154 is reciprocably received in bore 148 and provides a power wall for the booster section. An abutment 156 on the rearward side of piston 154 is in engagement with the forward end 124 of sleeve 118, this sleeve forward end extending through opening 152 in sealing relation therewith. Plunger end 140 extends through an opening provided in abutment 156. The valve element 158 is reciprocably mounted in piston 154 and cooperates with valve element 160 on the forward end of plunger 128 to provide the control valve assembly for the hydraulic booster section 46. This valve assembly is of the open center type and therefore the valve elements are spaced sufficiently apart axially to provide substantially unrestricted flow of hydraulic fluid through the valve assembly so long as the hydraulic booster section is not actuated. Spring 157, in chamber 159 of power piston 154, urges valve element 158 against abutment 156. Piston 154 has a passage 162 on the low pressure side of valve element 158 which communicates that side of the valve with the exhaust chamber 164. This chamber is on the forward side of piston 154 and is formed by the forward portion of bore 148. The booster section power chamber 166 is on the rearward side of piston 154 and upstream of the valve assembly formed by elements 158 and 160. Passage 167 in piston 154 connects chamber 159 with power chamber 166. Piston 154 has a push rod-like extension 168 which extends through chamber 164 and the end seal 170 defining the forward end of that chamber. Extension 168 forms the output member of the hydraulic booster section. It also extends through the end seal support and retainer 172, which has a generally dished annular configuration and is secured in the forward end of housing 146. The housing forward end and this retainer are constructed to provide for a drain and vent which will provide a path for removal of any hydraulic booster fluid which may leak through seal 170 to prevent its possible contamination of master cylinder brake fluid.

Port 36 is connected by passage 174 to power chamber 166. Port 38 is connected to exhaust chamber 164. A pressure relief or bypass valve passage 176 connects passage 174 and chamber 164. Pressure relief valve 178 is mounted in passage 176. The valve is normally closed but is opened when pressure in inlet passage 174 exceeds the predetermined pressure required to open the valve. When the valve opens, it relieves the excess input pressure through passage 176 and exhaust chamber 164 to port 38, conduit 40 and reservoir 42.

The hydraulic booster section is in the position shown in FIG. 3 when released, piston return spring 180 holding the piston abutment 156 against the forward end of sleeve 118. When the push rod 58 is moved leftwardly, the air valve 90 and plunger 128 move leftwardly relative to sleeve 118, and valve element 160 moves toward valve element 158 to restrict flow therethrough and cause a build-up of pressure in power chamber 166. The axial spacing between valve elements 158 and 160 is such, relative to the axial spacing between air valve 100 and the released position of floating valve 92, that the booster section 64 will not be actuated until the hydraulic booster section 46 is given an opportunity to be activated to its full extent. The pressure increase in chamber 166 acts on piston 154 to move the piston leftwardly, the extension or output member 168 therefore moving in the master cylinder actuating direction because of the force generated by the hydraulic power booster section. The valve elements may reach a poised position wherein the amount of restriction to flow therethrough creates just enough pressure in power chamber 166 to balance power piston 154 against spring 180 and the reaction force from the master cylinder section exerted on extension 168. An annular effective reaction area on plunger 128 exposed to pressure in power chamber 166 will provide a proportional feel to the vehicle operator. It is noted that a T-shaped vent passage 182 in the forward end of plunger 128 vents an area between seal 130 and a similar seal 184 to exhaust chamber 164 so that any hydraulic fluid which might leak past seal 184 will be returned to the hydraulic booster section and will not enter the vacuum booster section. A suitable vent 186 is provided between walls 150 and 126 to prevent the entry of any hydraulic fluid into the vacuum booster section which passes the seal 188 between wall 150 and sleeve 118.

The master cylinder section 48 is of the tandem type in which primary and secondary pistons are received in a common bore and pressurize brake fluid in separate pressurizing chambers for separate brake actuating circuits. The section includes a housing 190 in which bore 192 is formed. Primary pressurizing piston 194 and secondary pressurizing piston 196 are reciprocably received in bore 192 and respectively define therewith primary pressurizing chamber 198 and secondary pressurizing chamber 200. Piston return spring 202 in chamber 200 urges piston 196 against the caged spring retainer 204. This retainer is slidably mounted on headed bolt 206, which is secured to the forward end of primary piston 194. Spring 208 is caged between piston 194 and retainer 204. When the assembly is in the brake released position illustrated this provides a precise positioning of the secondary piston 196. Piston 194 is precisely positioned against its stop 210 and the caging mechanism precisely positions piston 196 relative to piston 194. Suitable cup seals 212 are provided on the pistons, as is well-known in the art.

The master cylinder reservoir 214 includes a single primary reservoir section 216 and secondary reservoir sections 218 and 220. Each of the secondary reservoir sections has compensation ports 222, 224 and 226, 228 which provide for compensation of the brake circuits connected to each of the pressurizing chambers. The reservoir construction is based on the disclosure of U.S. Pat. No. 3,937,020, entitled "Master Cylinder." The particular construction is claimed in U.S. Pat. Nos. 3,851,737 and 3,877,228, each entitled "Master Cylinder Assembly and Reservoir for Same." A baffle 230 is provided for secondary reservoir 218 and a dam 232 is provided for secondary reservoir 220 to increase the capacity of that secondary reservoir. A suitable fluid level sensor 234 is provided in the primary reservoir section 216.

Primary pressurizing chamber 198 is connected by port 236 to brake conduit 52 and secondary pressurizing chamber 200 is connected by port 238 to brake conduit 50. While the schematic illustration of FIG. 1 shows the secondary pressurizing chamber 200 connected to the front brake circuit conduit 50 and the primary pressurizing chamber 198 connected to the rear brake circuit conduit 52, in some installations this may be reversed so that the front brakes are actuated by brake pressure generated in the primary pressurizing chamber 198.

The rear face of piston 194 has a socket 240 which receives the end 241 of extension 168 so that the output member formed by extension 168 is in direct force transmitting and drive relation with piston 194. When output member 168 is moved leftwardly under influence of any force or combination of forces as described above, piston 194 moves leftwardly so that its cup seal 212 closes compensation port 226 and it begins to pressurize fluid in chambers 198. The pressurized fluid and the force exerted through spring 208 combine to move secondary piston 196 leftwardly so that its cup seal 212 closes compensation port 222, the piston continuing to move against the force of return spring 202 to pressurize brake fluid in chamber 200. The brake actuating pressures so generated in chambers 198 and 200 are respectively delivered to the rear brakes 20 and the front brakes 18 to actuate the vehicle wheel brakes.

It can be seen that the master cylinder can be actuated to generate brake actuating pressure by any of several methods.

Normally, when the vehicle operator exerts manual force on the brake pedal it is transmitted mechanically by push rod 58, air valve 90, and plunger 128 to move valve element 160 toward valve element 158 and restrict hydraulic flow, thereby building up boost pressure in chamber 166. This causes piston 154 to move, driving extension member 168 to energize the master cylinder assembly and generate brake actuating pressures. Since the vacuum power piston return spring 102 is lighter than hydraulic power piston return spring 180, the vacuum booster power wall 68 will be moved manually leftward, following the hydraulic power wall 154. This occurs since the two power walls operatively engage sleeve 118, and as piston 154 moves leftwardly only spring 102 resists manual leftward movement of piston 78, so the piston 78 with its valve 100 moves with air valve 90 once the air valve has moved axially enough to actuate the hydraulic booster.

The valve element 158 also has an important function in that it is a means for blocking movement of the control valves beyond the first range of movement, in which only the hydraulic booster section is actuated, under full power operation of the hydraulic booster section. This is accomplished by placing the booster pressure in chamber 166 behind the valve element in chamber 159. The vehicle operator will not be able to move the valve element leftwardly against this force under these conditions, so the vacuum booster section is prevented from operation at this time.

Figure 2:
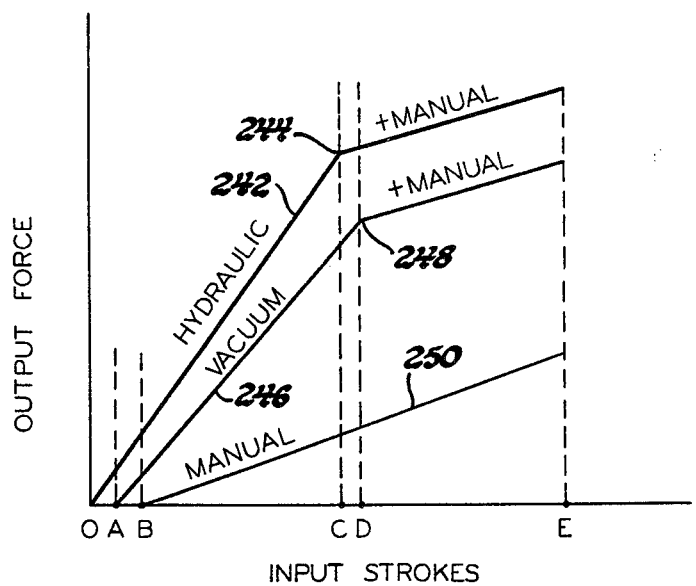
FIG. 2 is a graph indicating the performance of the brake booster assembly under various operating conditions.

Hydraulic booster section actuation begins at point O in FIG. 2 and follows curve 242. Upon hydraulic booster runout, which occurs at input stroke point C and point 244 on curve 242, the manual force exerted on plunger 128 causes it to mechanically contact valve element 158 and move that element and piston 154. The valve element 158 does not move relative to piston 154 because of the blocking action described above. Under normal operating conditions, this will occur when the power pistons 78 and 154 have both moved throughout their normal operating stroke even though only the hydraulic booster has been actuated. Additional manual force applied is therefore exerted through the booster sections, being transmitted mechanically through plunger 128, valve element 158, piston 154 and extension 168 to the master cylinder assembly.

If for any reason there is no hydraulic pressure available to operate the hydraulic booster section 56 upon brake actuating movement of the brake pedal, the air valve 90 will move to permit floating valve 92 to close valve 100. This movement is accommodated in the hydraulic booster section by the engagement of the end 160 of plunger 128 with valve element 158 and subsequent movement of that valve element against spring 157. Since there is no blocking pressure generated in chamber 159, the valve element 158 can move relative to piston 154. As shown in FIG. 2, this movement is represented by the line O-A. As input stroke movement continues, the vacuum booster section is actuated as represented by curve 246. The vacuum booster reaches run-out at point 248 on the curve, after which additional manual force may be applied by input stroke movement from point D toward point E.

Should there be no hydraulic or differential air pressure available when the assembly is actuated, manual force from the brake pedal is transmitted to the master cylinder assembly initially. As shown in FIG. 2, the input stroke represented by line O-B takes up the axial spacing in the hydraulic booster section between plunger 128 and valve element 158, reaching point A, followed by movement to compress spring 157 and to move the master cylinder pressurizing pistons until their cup seals 212 close their compensating ports 222 and 226. This is accomplished by the time the input stroke is at point B. Further movement results in manual actuation of the master cylinder assembly along curve 250. The maximum stroke in all instances is represented by input stroke position E.

The invention provides a dual power brake with numerous advantages over present brake systems. In normal operation it delivers the high performance level obtainable from a hydraulic brake booster, and occupies less space than would a vacuum brake booster of equivalent performance. The two power sources are completely independent of each other so that the assembly will operate if power is provided by either power source. The assembly provides for effective manual operation when no power is available from either or both power sources. It retains the advantageous features of current vacuum powered boosters by having sufficient vacuum stored to provide several power braking stops when the vehicle engine is not running. It lends itself to a basic plumbing circuit requiring only the hydraulic connections to and from the brake booster section. It provides the same brake pedal feel to the vehicle operator that is provided in current production vehicles using hydraulic power brake boosters of the type shown in U.S. Pat. No. 3,699,680, for example. Since it operates normally with the hydraulic booster section, it may be readily used with vehicle engines having little vacuum reserve, or even with a separate vacuum source if needed. This is particularly true when diesel engines are used in the vehicle. The system will retain power brake availability when the power steering pump does not run, when the power steering hydraulic circuit loses pressure for any other reason, or when there is a loss of vacuum power for the vacuum booster section. At all times it provides a direct manual follow-through brake actuation upon which the vehicle operator can ultimately rely even if he loses power to both power booster sections. While not shown, it may be adapted to use compressed air to obtain a differential air pressure for operation of booster section 44, instead of or in addition to vacuum.

Summarizing the operation of the assembly, the booster sections are independently power operable and are in operative series relation with the master cylinder section. The booster sections are separately actuated by manual force input means including push rod 58, air valve 90, and plunger 128, which are moved for this purpose. The control valves 90 and 160 are concurrently movable through a first range of valve movement which conditions the hydraulic booster section for power operation by restricting the valve area between valve elements 158 and 160. During this range of movement valve 90 permits floating valve 92 to approach valve 100, but not to engage it. When the hydraulic booster section is operating normally, pressure acting behind valve element 158 blocks the valves 90 and 160 from moving into their second range of valve controlling movement. If there is no hydraulic boost pressure generated upon actuation, there is no blocking force, and the valves 90 and 160 move concurrently within a second range of valve movement as spring 157 is compressed, actuating the vacuum booster section. Upon run-out of either booster section, additional force may be applied manually to the master cylinder assembly.

That assembly may also be manually actuated when neither booster section is power operable.

What is claimed is:

1. A brake booster and master cylinder assembly comprising:

first and second independently power operable booster sections and a master cylinder section in operative series relation;

manual force input means movable to control the separate actuation of said booster sections and including axially movable control valves for each of said booster sections, said control valves having first and second ranges of valve movement and being concurrently movable through first and second ranges of valve movement to condition said first booster section for power operation of said master cylinder section only during said first range of valve movement and to condition said second booster section for power operation of said master cylinder section only during said second range of valve movement;

and blocking means, responsive to full power operation of said first booster section, blocking movement of said control valves beyond said first range of valve movement, said blocking means also being responsive to lack of power operation of said first booster section in said first range of valve movement so that upon said lack of power operation said blocking means permits movement of said control valves through said second range of valve movement.

2. A brake booster system comprising:

a manually movable input member;

a movable output member;

a master cylinder section actuatable throughout its entire brake actuating range by movement of said output member through a predetermined range of output member movement;

first and second independently powered brake booster sections in operative series relation with said master cylinder section, said output member being the output member of said first brake booster section;

said manually movable input member being movable to control the separate actuation of said brake booster sections;

control valve means for each of said brake booster sections having first and second sequential ranges of control valve means movement and connected to be concurrently moved in a brake actuating direction in response to movement of said input member through said first and second sequential ranges of valve means movement to condition one of said booster sections for power operation of said master cylinder section only during said first range of valve means movement and to condition the other of said booster sections for power operation of said master cylinder section only during said second range of valve means movement; movement of said control valve means in response to movement of said input member, through either one of said ranges of valve means movement which causes full power actuation of one of said brake booster sections, resulting in movement of said output member throughout said predetermined range of output member movement by power actuation of said one of said brake booster sections;

and blocking means, responsive only to full power actuation of one of said booster sections in response to movement of said control valve means through only said first range of valve movement, blocking movement of said control valve means beyond said first range of valve movement, said blocking means also being responsive to lack of power operation of said one booster section in said first range of valve movement so that upon said lack of power operation said blocking means permits movement of said control valve means through said second range of valve means movement.

3. A brake booster and master cylinder assembly comprising:

a differential air pressure powered booster section;

a hydraulic pressure powered booster section in operative series therewith;

a master cylinder section in operative series with said booster sections to be operated thereby;

and manual force input means controlling the actuation of said booster sections and providing for manual operation of said master cylinder section;

said hydraulic booster section having first valve control means including a first valve and a first valve seat, said first valve being movable by said manual force input means through a first range of movement towards said first valve seat to restrict hydraulic fluid flow therethrough when hydraulic fluid flow is provided, said first valve at the end of said first range of movement engaging said first valve seat, said first valve and said first valve seat thereafter being movable as a unit through a second range of movement;

said air booster section having second valve control means including a second valve and a second valve seat, said second valve being movable in response to movement of said manual force input means concurrently with said first valve through said first range of movement towards said second valve seat, said second valve substantially at the end of said first range of movement engaging said second valve seat, said second valve and said second valve seat thereafter being movable as a unit as said manual force input means moves through said second range of movement;

said air booster section second valve control means further including a third valve and a third valve seat which are in engagement during said first range of movement and open only during said second range of movement to permit air flow therethrough for the establishment of a controlled differential operating air pressure in said air booster section only during said second range of movement;

and piston means responsive to hydraulic pressure build-up in said hydraulic booster section power actuation to block movement of said first valve seat and thereby prevent movement of said valves and said valve seats through said second range of movement.

* * * * *